United States Patent [19]

Heckmann

[11] 4,082,675

[45] Apr. 4, 1978

[54] VIBRATING CENTRIFUGE

[75] Inventor: Wolfgang Heckmann, Bergisch-Gladbach, Germany

[73] Assignee: Klockner-Humboldt-Deutz Aktiengesellschaft, Germany

[21] Appl. No.: 279,237

[22] Filed: Aug. 9, 1972

[30] Foreign Application Priority Data

Aug. 14, 1971 Germany ............................ 2140841
Jun. 15, 1972 Germany ............................ 2229114

[51] Int. Cl.[2] ............................................ B01D 33/02

[52] U.S. Cl. ................................ 210/360 R; 210/384; 210/385; 210/388

[58] Field of Search ............... 210/360, 384, 385, 388; 68/173

[56] References Cited

U.S. PATENT DOCUMENTS 2,781,130 2/1957 Heckmann et al. .................. 210/384
2,781,131 2/1957 Heckmann ....................... 210/384 X

*Primary Examiner*—Frank A. Spear, Jr.
*Assistant Examiner*—Richard W. Burks
*Attorney, Agent, or Firm*—Hill, Gross, Simpson, Van Santen, Steadman, Chiara & Simpson

[57] ABSTRACT

A vibrating centrifuge provided with a rotary support body has mounted thereon a basket receiving the granular material to be dehydrated and is operatively connected with a vibrating mechanism and also with a rotary drive, as well as thrust spring elements which yieldably connect the rotary drive with the support body. These thrust spring elements are arranged in an annular space between the outer circumference of said support body and the inner circumference of a drive sleeve forming a part of the rotary drive, and variable adjusting member engaging said thrust spring elements are employed for carrying the radial height of said thrust spring elements.

10 Claims, 4 Drawing Figures

VIBRATING CENTRIFUGE

The invention relates to a vibrating centrifuge whose basket is carried by a support body to which is connected a vibrating means and which by the thrust spring means is elastically connected with a rotary drive.

The German Patent Specification No. 1,205,461 discloses already a vibrating centrifuge of the mentioned type in which the basket is elastically connected by rubber springs with a rotary drive. The rubber spring comprises annularly shaped members which are so arranged that the same are yieldable substantially in axial direction and do not permit any movement in radial direction in order to prevent any tumbling movement of the rotating basket. The required properties of the mounting of the basket were heretofore obtained by annularly shaped rubber springs which are vulcanized to a support body which carries the basket. The exterior diameter of these rubber springs were selected to be larger than the inner diameter of a drive sleeve which was connected with the rotary drive. This drive sleeve is used for connecting the support body and the rotary drive by the rubber springs which were subjected to high axial forces. This results in a deformation of the rubber springs in radial direction which in turn transmits the drive movement and the thrust forces required for a pretensioning of the rubber springs. In large vibrating centrifuges which have for instance a capacity of 300 tons per hour, it is, however, practically not possible to obtain the necessary axial forces for connecting the support body and the drive sleeve.

It is an object of the invention to overcome the difficulties of these known constructions, particularly when the same have large dimensions and to provide for a simple exchange of the rubber elastic connecting elements arranged between the basket and the rotary drive.

For the purpose of obtaining the object of the invention are provided adjusting devices which permit a variation of the height of the thrust springs arrangement for the purpose of assembly. The arrangement of the adjusting devices of the invention and of the thrust spring arrangement has a number of advantages. The thrust spring arrangement for the purpose of assembly may be deformed in radial direction to such an extent that the respective connecting part of the rotary drive may be slidably moved over the thrust spring arrangement without the application of pressure forces. This has the advantage that the repair and the maintenance of vibrating centrifuges constructed in this manner are substantially facilitated and the operators are capable at any time to inspect and replace the elastic connection between the basket and the rotary drive. Formerly this type of construction and maintenance in vibrating centrifuges was substantially more difficult. Owing to a releasable construction of the elastic connection the basket may be adjusted in simple manner with respect to the vibrating drive in that its eccentric drive is adjusted to a center position between its upper and lower dead center so as to assure the smallest starting moments and to avoid an overload of the drive motor for the eccentric drive.

In accordance with the invention, the thrust spring arrangement comprises a plurality of rubber elastic thrust spring elements which are uniformly distributed along the circumference of the support body and are arranged in axially parallel relation. The advantage of this construction is, that depending upon the worn condition, the individual thrust spring elements may be easily exchanged and this results in substantially reduced expense for repairs.

It is of advantage when the adjusting devices, with respect to the axis of rotation, are arranged on the exterior surfaces of the thrust spring arrangement, and preferably engage all at the same time the rotary drive. This has the advantage that the parts subject to wear may be very easily exchanged.

In accordance with another object of the invention the adjusting devices are adjustable by a special releasable tension element in radial direction with respect to the support body. This has the advantage that the thrust spring elements and the adjusting devices may each be loosely placed one upon each other during the assembly and are exclusively held on the supporting body by the mentioned tension elements so that the thrust spring elements not need be vulcanized to the support body.

According to another embodiment of the invention, the support body within the range of each adjusting device is provided with at least one radial bore, comprising preferably a threaded bore, for the reception of a releasable tension element extending through the Adjusting device and, if necessary, extending also through the thrust element. This arrangement permits a tensioning of the adjusting device with respect to the thrust elements in a very simple manner, for instance by a conventional screw serving as a securing and tensioning element.

It is also advisable when the exterior of the adjusting device is provided with a recess for a complete reception of the head of the tension element. Therefore, in accordance with the invention the head of the tension element is disposed completely flush with the adjusting device and this has the advantage that during the final assembly of the corresponding parts of the rotary drive only a very, little play in coaxial direction above the adjusting device is required and an excessive compression of the thrust spring elements, mostly made of rubber, is not required.

In an advantageous construction of the vibrating centrifuge the rotary drive is provided with a drive sleeve, which coaxially surrounds the support body and the thrust spring elements and the adjusting devices thereon. In particular when the drive sleeve is releasable from the rotary drive the assembly and the disassembly of the elastic connection between the basket and the rotary drive is substantially simplified in a vibrating centrifuge of this type.

In a preferred construction the surfaces of the adjusting devices which face away from the thrust spring elements with reference to the axis of rotation are constructed as cylindrical surfaces which correspond to the inner surface of the drive sleeve. The advantage of this construction is that the adjusting devices engage with their outer surfaces completely the inner surface of the drive sleeve so that an uniform friction engagement of the support body and the rotary drive is established. Not only the drive sleeve but also the adjusting devices comprise turned parts of simple construction which permit also a simple assembly.

A further object of the invention is that the threaded bores in the support body are each arranged in alignment with a bore extending through the drive sleeve and the cross section of these bores is of the same size or larger than that of the head of the tension element. This has the advantage that the necessary elastic connection between the support body and the drive sleeve of the rotary drive may be accomplished by the loosening of threaded connections from the exterior to the drive sleeve.

According to a further object of the invention, the support body within the range of the elastic connection of the basket with the rotary drive has a hexagonal cross section. In this manner one may employ other than annularly-shaped thrust elements. The elastic mounting will have the same effect when the support body has a plurality of plane surfaces and when preferably rectangular thrust spring elements are used which may be produced very economically.

According to still another preferred embodiment of the invention, at least one part of the thrust spring elements after its connection with the adjusting devices has at least one part which in its longitudinal direction and thrust direction may increase or decrease in height. This has the advantage that the thrust springs in their intended working range have a far-reaching variable non-linear spring characteristic so that the movement path of the vibrating basket may be varied within wide ranges. This particular advantage of a progressive spring characteristic may be selected when these thrust spring elements after their connection with the adjusting device have the shape of a circular segment. In this manner the elastic connection between the support body and the rotary drive at the same time performs the function of a limiting stop for the basket so that additional path limiting structural elements may be dispensed with.

In addition, a preferred embodiment of the invention may be provided with individual thrust springs all of which have the same shape and are curved in axial direction. This has the result that in an advantageous manner high surface tensions are avoided during the tensioning of the thrust spring elements by the adjusting devices and solely thrust and pressure forces will occur which do not have a disadvantageous influence on the life span of the thrust spring elements.

With this and other objects in view, the invention will now be described in greater detail with reference to the accompanying drawings which disclose by way of example one embodiment of a vibrating centrifuge in accordance with the invention.

IN THE DRAWINGS

Figure 1:
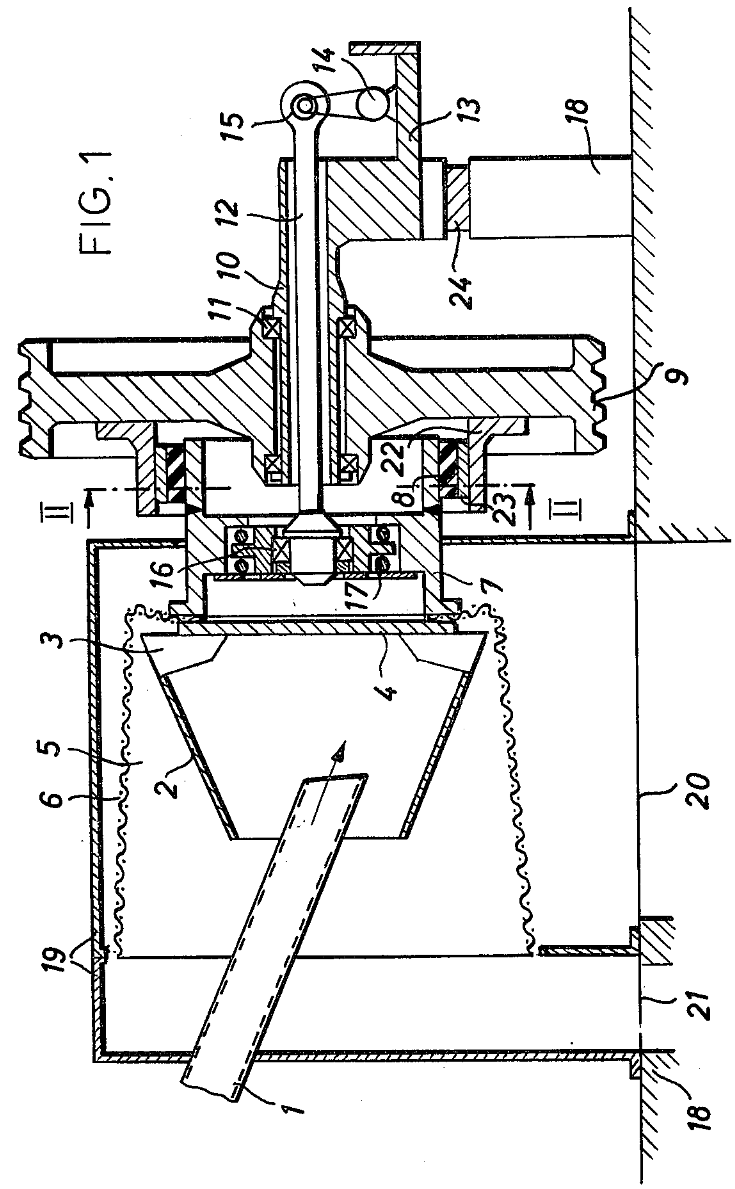
FIG. 1 is a longitudinal sectional view of a vibrating centrifuge.

The vibrating centrifuge illustrated in FIG. 1 is used for dehydrating of granular material and is provided with a material feed tube 1 which extends inclined into the interior of a conical distribution sleeve 2 rotatable about a horizontal axis. The larger end of the conical sleeve 2 is connected by ribs 3 to a base plate 4. The base plate 4 has also attached thereto a basket 5 comprising a frusto-conical screen cover 6 which concentrically surrounds the distribution sleeve 2. The left-hand end of the distribution sleeve tube opens toward the direction of the incoming material. The distribution sleeve 2 and the basket 5 are connected by means of said base plate 4 to an annular support body 7 which is connected by a thrust spring arrangement 8, comprising a plurality of thrust spring elements 8' with a rotary drive 9. This rotary drive 9, by way of a sample, comprises a belt pulley which is driven by a not-illustrated drive motor and not-illustrated cone belts. The belt pulley 9 is rotatively mounted on a horizontal stationary tubular support sleeve 10 by bearings 11.

A horizontal pushrod extends through the entire horizontally disposed tubular support sleeves 10. One end of this pushrod 12 is connected by means of a crank or eccentric drive 15 with a motor 14 mounted on the machine frame 13. The other free end of the horizontally disposed pushrod 12 carries a bearing 16 and annularly-shaped rubber springs 17 which serve as elastic coupling springs connected with the support body 7.

The basket 5 is surrounded by an all around closed housing 19 and is secured to the machine frame 18. The latter is provided with two lower openings 20 and 21 for the separate discharge or withdrawal of the solids and the liquids, respectively.

During the operation the rotary driving force is transmitted from the belt pulley 9 to a drive sleeve 22 attached to one face of the belt pulley 9 and from here the torque is transmitted by adjusting devices 23 and the thrust spring arrangement 8 to the annular support body 7. The basket 5 which is attached to the support body 7 is therefore driven with the speed of the drive sleeve 22 or the speed of the belt pulley 9. At the same time the basket 5 is actuated by the crank or eccentric drive 15 to perform positive vibrations in the direction of the axis of rotation when this takes place the thrust spring arrangement 8 and the rubber element 24 are subjected to a shearing force. The basket and the drive therefore constitute relative to vibration a two-mass system whose inertia forces are compensated.

The granular material to be dehydrated is conducted by the feed tube 1 into the rotating and vibrating basket 5. Due to the action of the centrifugal force the material travels along the inner face of the distribution sleeve 2 into the basket 5. In the basket 5 the material is delivered onto the rotating and vibrating screen cover 6 and travels along the inside of the screen cover 6 towards the material discharge aperture 21. The water which was withdrawn from the material along the screen cover 6 by centrifugal force is collected in the aperture 20 of the housing 19.

Figure 3:
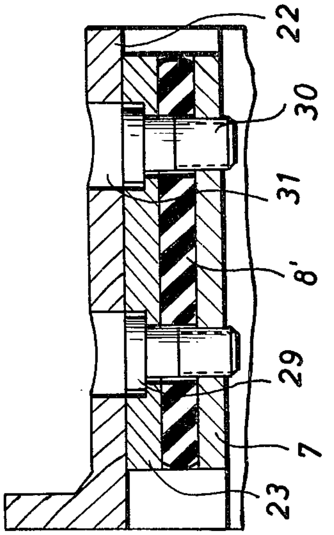
FIG. 3 is a sectional view of the elastic mounting or support along the line III—III of FIG. 2.
Figure 2:
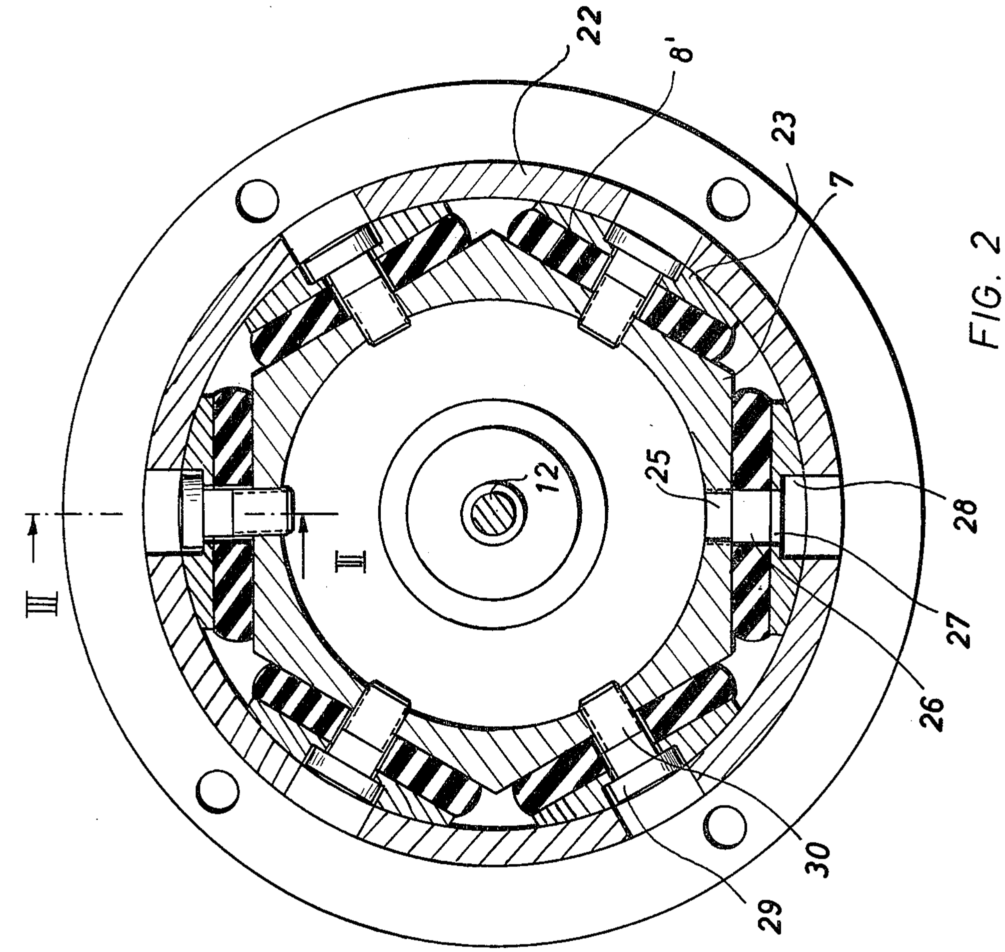
FIG. 2 is a cross sectional view of the elastic connection taken along the line II—II of FIG. 1 in an enlarged scale.

The FIGS. 2 and 3 illustrate in an enlarged scale a sectional view of the elastic connection between the basket 5 and the rotary drive 9. The support body 7 in the range of its elastic connection with the rotary drive 9 is provided preferably with a hexagonal cross section and each of the plane outer faces of this hexagonal body is provided advantageously with threaded bores 25 which are arranged radially with respect to the axis of rotation of the body 7. Each plane surface of the support body 7 has placed thereon preferably a rectangularly-shaped thrust spring element 8'. Within the range of each threaded bore 25 is arranged in axial alignment therewith in each thrust spring element 8' a bore 26 which goes entirely through the spring element 8'. The cross section of the bore 26 is equal or larger than the cross section of the threaded bore 25. On each thrust spring element 8' is arranged an adjusting device 23 having preferably the shape of a circular segment in such a manner that the plane faces of the thrust spring elements 8' and of the adjusting devices 23 are in engagement with each other and the axes of the bores 26–27 therethrough are in axial alignment with the threaded bores 25 in the support body 7. The adjusting device 23, within the range of each bore 27, is provided with a recess 28 which is intended to receive completely the head 29 of a special releasable tension element 30 comprising, for instance, a fastening and tensioning screw.

For the purpose of installing the elastic connection of the basket 5 with the rotary drive 9 the adjusting devices 23 after being placed on the outer faces of the thrust spring elements 8' are pressed by the screws 30 uniformly toward the support body 7 in such a manner that the radial height of the thrust spring elements in radial direction is reduced. Then the support body 7 with the thrust spring elements 8' and the adjusting devices 23 thereon, which latter are arranged within a small distance away from the inner face of the drive sleeve 22, is axially slidably moved into the latter and then the starting position of the vibrating drive is adjusted in that the eccentric drive is moved into a center position between its upper and lower dead center so that the least possible starting torque may be applied. Thereupon the screws 30 are uniformly loosened and are removed through the bores 31 provided in the drive sleeves 22, so that an elastic friction-type connection remains within the annular space between the support body and the drive sleeve 22. For the purpose of disassembling the elastic connection or for readjusting the vibrating drive the above-described assembly procedure is performed in the reverse direction.

Figure 4:
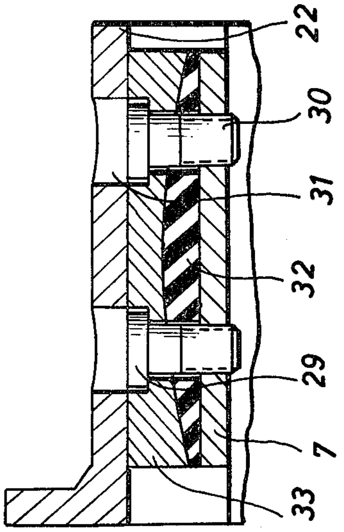
FIG. 4 illustrates a sectional view of a preferred embodiment of the elastic connection.

In a preferred shape of the elastic connection arranged between the basket 5 and the rotary drive 9 the adjusting devices 33 according to FIG. 4 may have the shape of a circular segment whose curved side faces the thrust spring elements 32. The thrust spring elements 32, which preferably have also the shape of circular segments, are fitted with their curved faces into the curved cutouts of the adjusting devices. For the purpose of assembling or disassembling the elastic connection the adjusting devices as described in the foregoing are tensioned or released with respect to the support body 7 and then the desired connection with the rotary drive 9 is adjusted. The elastic connection illustrated in FIG. 4 has a preferable progressive spring characteristic so that the same serves at the same time as a limiting abutment which limits the path of movement of the basket 5 in its vibrating direction so that additional movement limiting constructional elements need not be employed.

The elastic mounting or connection of the invention is not limited to the one described, by way of example, in the foregoing description, but may also be employed in connection with a two-sided mounted long vibrating centrifuge of substantial size. Likewise the construction of the described adjusting device and of the thrust spring elements may be greatly varied, for example, the adjusting devices and thrust spring elements described by way of example in the foregoing, may also be employed in the form of segments of a hollow cylinder in order to produce the required power connection between the drive sleeve and the support which is circular in cross section. Furthermore, the outer face of the adjusting devices and the inner face of the drive sleeve may be changed in such a manner that the adjusting devices have in cross section the shape of keyway shafts, while the drive sleeve in cross section may have the form of a keyway sleeve which are slidably moved one into each other to produce an operative connection between the support body 7 and the rotary drive 9.

What we claim is:

1. A vibrating centrifuge for the separation of water from finely grained material comprising in combination:
- a rotatable centrifugal basket oscillatable in an axial direction;
- a rotary drive for the basket;
- an oscillating drive connected to the basket for driving in oscillatable axial motion;
- an annular support body holding the centrifugal basket;
- a drive sleeve connected to the rotary drive concentrically surrounding the annular support body;
- a plurality of thrust springs arranged circumferentially and extending radially between said support body and said drive sleeve for elastic connection therebetween;
- and adjusting elements for the thrust springs adjusting the radial height of the thrust springs and pretensioning the springs radially and operative to change the spring tension in a radial direction for assembly purposes.

2. A vibrating centrifuge comprising:
- a rotary support body;
- a basket carried by said support body;
- a vibrating means operatively connected with said support body;
- a rotary drive;
- a number of rubber elastic thrust spring members spaced along the circumference of said support body;
- adjusting means engaging the outer end surface of the rubber elastic thrust spring members and engaged by said rotary drive; and
- releasable tension elements which engage said adjusting means and extend radially into said support body to be radially adjusted with respect to the same.

3. A vibrating centrifuge comprising:
- a rotary support body;
- a basket carried by said support body;
- a vibrating means operatively connected with said support body;
- a rotary drive;
- a number of rubber elastic thrust spring members spaced along the circumference of said support body;
- and releasable adjusting screws which extend through said adjusting means and said rubber elastic thrust spring members and into radial threaded bores in said support body.

4. A vibrating centrifuge according to claim 3, in which the outer surfaces of said adjusting means are provided with recesses for the reception of the heads of said adjusting screws, said heads being flush with the outer surfaces of said adjusting means.

5. A vibrating centrifuge comprising:
- a rotary support body;
- a basket carried by said support body;
- a vibrating means operatively connected with said support body;
- a rotary drive;
- a drive sleeve forming a part of said rotary drive;
- thrust spring means yieldably connecting said rotary drive with said support body;

adjusting means for varying the height of said thrust spring means with respect to said support body for the purpose of assembly;

and said drive sleeve surrounding concentrically said support body and the thrust spring means as well as the adjusting means thereon.

6. A vibrating centrifuge comprising:

a rotary support body;

a basket carried by said support body;

a vibrating means operatively connected with said support body;

a rotary drive;

a number of rubber elastic thrust spring members spaced along the circumference of said support body;

adjusting means engaging the outer end surface of the rubber elastic thrust spring members and engaged by said rotary drive;

releasable adjusting screws which extend through said adjusting means and said rubber elastic thrust spring members and into radial threaded bores in said support body and including a drive sleeve forming a part of said rotary drive;

said drive sleeve surrounding concentrically said support body and the thrust spring means as well as the adjusting means thereon; and said drive sleeve being provided with apertures arranged in axial alignment with said adjusting screws which attach said adjusting means and said thrust spring members to said support body.

7. A vibrating centrifuge comprising:

a rotary support body;

a basket carried by said support body;

a vibrating means operatively connected with said support body;

a rotary drive;

thrust spring means yieldably connecting said rotary drive with said support body;

adjusting means for varying the height of said thrust spring means with respect to said support body for the purpose of assembly;

and the faces of said adjusting means being directed away from said thrust spring means and cylindrically curved and engaging a similarly curved inner surface on a drive sleeve forming a part of said rotary drive.

8. A vibrating centrifuge comprising:

a rotary support body;

a basket carried by said support body;

a vibrating means operatively connected with said support body;

a rotary drive;

thrust spring means yieldably connecting said rotary drive with said support body;

adjusting means for varying the height of said thrust spring means with respect to said support body for the purpose of assembly;

and said support body being hexagonal in cross section and each of the six faces of said hexagonal support body having placed thereon said thrust spring means.

9. A vibrating centrifuge comprising:

a rotary support body;

a basket carried by said support body;

a vibrating means operatively connected with said support body;

thrust spring means yieldably connecting said rotary drive with said support body;

adjusting means for varying the height of said thrust spring means with respect to said support body for the purpose of assembly;

said thrust spring means including a number of rubber elastic thrust spring members uniformly spaced along the circumference of said support body;

and at least a portion of said elastic thrust spring members after installation on said support body varying in height with reference to the direction of thrust which is in axial direction of said support body.

10. A vibrating centrifuge comprising:

a rotary support body;

a basket carried by said support body;

a vibrating means operatively connected with said support body;

a rotary drive;

thrust spring yieldably connecting said rotary drive with said support body;

adjusting means for varying the height of said thrust spring means with respect to said support body for the purpose of assembly;

said thrust spring means including a number of rubber elastic thrust spring members uniformly spaced along the circumference of said support body;

and said rubber elastic members having all the same shape and are curved in axial direction of said support member.

* * * * *